United States Patent [19]
Moore

[11] Patent Number: 5,982,616
[45] Date of Patent: Nov. 9, 1999

[54] ELECTRONIC APPARATUS WITH PLUG-IN HEAT PIPE MODULE COOLING SYSTEM

[75] Inventor: David A. Moore, Tomball, Tex.

[73] Assignee: Compaq Computer Corporation, Houston, Tex.

[21] Appl. No.: 08/917,794

[22] Filed: Aug. 20, 1997

[51] Int. Cl.$^6$ .................................. G06F 1/20; H05K 7/20
[52] U.S. Cl. ..................... 361/687; 361/699; 361/700; 165/104.33; 174/15.2
[58] Field of Search ..................................... 361/687, 699, 361/700, 701; 312/236; 439/485; 165/104.33; 174/15.2

[56] References Cited

U.S. PATENT DOCUMENTS

| | | | |
|---|---|---|---|
| 4,315,300 | 2/1982 | Parmerlee et al. | 361/703 |
| 4,341,432 | 7/1982 | Cutchaw | 439/485 |
| 5,289,342 | 2/1994 | Spalding et al. | 165/104.33 |
| 5,343,358 | 8/1994 | Hilbrink | 361/700 |
| 5,353,191 | 10/1994 | Volz et al. | 439/485 |
| 5,696,405 | 12/1997 | Weld | 361/687 |
| 5,712,762 | 1/1998 | Webb | 174/15.2 |
| 5,757,615 | 5/1998 | Donahoe et al. | 361/687 |
| 5,764,483 | 6/1998 | Ohashi et al. | 361/699 |

*Primary Examiner*—Lynn D. Feild
*Assistant Examiner*—John D. Reed
*Attorney, Agent, or Firm*—Konneker & Smith, P.C.

[57] ABSTRACT

A self-contained liquid cooled heat sink system disposed in a computer has a plurality of socket portions through which a cooling liquid is pumped. Operating heat from a plurality of heat-generating computer components, representatively circuit board-mounted processor chips, is efficiently transferred to the heat sink system by heat pipe modules associated with the heat-generating components. Each module includes (1) an evaporator plate held in thermal contact with its associated component, (2) a condenser plate removably plugged into one of the sockets and in a heat transfer relationship therewith, and (3) a plurality of thermosyphoning type heat pipes interconnected between the evaporator and condenser plates. The use of the heat pipe modules permits rapid and easy pull-away electrical and cooling system disconnection for each processor board as well as providing for effective cooling of the processors without the necessity of forcing a flow of air across them.

17 Claims, 3 Drawing Sheets

ELECTRONIC APPARATUS WITH PLUG-IN HEAT PIPE MODULE COOLING SYSTEM

BACKGROUND OF THE INVENTION

1. Field of the Invention

The present invention generally relates to the cooling of heat-generating components in electronic apparatus and, in a preferred embodiment thereof, more particularly relates to the cooling of a heat-generating computer components, such as processor chips, using heat pipe cooling modules removably plugged into a self-contained heat sink cooling system disposed within the computer.

2. Description of Related Art

As their operating speeds and capacities keep increasing, it is becoming increasingly difficult to provide adequate cooling for processors and other high heat generating components used in electronic equipment. This is particularly true in the case of computers utilizing multiple processors and hot plug drive arrays. As an example, current high end computer processor power consumption is in the 35 watt range and continues to increase as faster and more powerful processors continue to be developed.

The use of extruded aluminum heat sinks has successfully met cooling needs until just recently. These metal heat sinks depend on air moving through the system to carry away waste heat. However, aluminum heat sinks have a number of well known disadvantages which include the following:

1. Heat sinks often need to be removed for processor removal. This can create service problems with thermal interface materials.
2. Large heat sinks can lead to wide spacing of multiple processors, causing signal propagation delay and package volume concerns.
3. The chassis design must typically provide high air flow past the heat sink.
4. Large heat sinks often restrict air flow to other components.
5. Heat sinks must be designed to fit the constraints of internal air speeds, air flow direction, mechanical space, and the effect of surrounding components. Due to these factors, heat sinks are often system specific.
6. Air heated by the processor heat sink is less effective at cooling other components in the electronic apparatus.
7. The unsupported mass of a large heat sink is a shock and vibration concern in the overall design of the electronic apparatus.
8. Fans may need to be added to the system or run at higher speeds to keep heat-generating components cool.

As an alternative to this conventional large heat sink forced convection cooling approach, liquid could be pumped through tubing to heat exchangers at each of the processor chips (or other high heat-generating components or assemblies;). Although this alternate cooling approach could easily provide the heat-generating components with adequate cooling, and could potentially solve some of the above-mentioned problems associated with forced air convective cooling using large heat sinks, it would tend to present problems of its own, including:

1. Plumbing would have to be routed through each processor area.
2. Removal of a processor would require manipulating plumbing fittings, or some sort of liquid disconnects.
3. With the separate plumbing branches routed to each processor or other heat-generating component, and all of the attendant fittings and joints, liquid leakage within the computer would be potential problem.
4. Multiple processor systems would either have to be shipped with all heat exchangers or provide fittings for future upgrades.

In view of the foregoing problems, limitations and disadvantages associated with the above-mentioned electronic apparatus cooling systems it can seen that a need exists for an alternative type of cooling system which eliminates or at least substantially reduces such problems, limitations and disadvantages.

SUMMARY OF THE INVENTION

In carrying out principles of the present invention, in accordance with a preferred embodiment thereof, electronic apparatus is provided which is representatively in the form of a computer system having a microprocessor and a data storage device operative to store data that may be retrieved by the microprocessor. The electronic apparatus comprises a heat-generating structure, representatively a processor chip, and a first thermal connector spaced apart from the heat generating structure.

A fluid cooling system is isolated from the heat-generating structure and is operative to dissipate heat received by the first thermal connector. A specially designed heat transfer module is provided which is operative to transfer heat from the heat-generating structure to the first thermal connector associated with the fluid cooling system.

The heat transfer module includes a second thermal connector disposed in a heat exchange relationship with the heat-generating structure, a third thermal connector removably connectable to the first thermal connector in a heat exchange relationship therewith, and a heat transfer structure interconnected between the second and third thermal connectors and operative to transfer heat from the second thermal connector to the third thermal connector.

Representatively, the first thermal connector has a generally socket-shaped configuration and the third thermal connector is generally plug-shaped and is releasably insertable into the first thermal connector. The fluid cooling system illustratively includes a housing having an interior with which the first thermal connector communicates, and heat removal means disposed within the housing and operative to flow fluid through the housing interior and using the fluid to receive heat transferred to the first thermal connector by the third thermal connector and dissipate the received heat. The heat removal means illustratively include a radiator, means for flowing a liquid sequentially through the first thermal connector and the radiator, and means for flowing a cooling gas through the radiator.

In a preferred embodiment of the heat transfer module the second thermal connector is a thermally conductive evaporator plate, the third thermal connector is a thermally conductive condenser plate, and the heat transfer structure includes at least one thermosyphoning heat pipe having a first end portion in thermal communication with the evaporator plate, and a second end portion in thermal communication with the condenser plate.

Representatively, the processor chip is mounted on a circuit board having a card edge connector portion releasably received in an electrical connector socket, and the circuit board is connected to the third thermal connector by a support structure releasably connectable to a chassis portion of the electronic apparatus to brace the heat transfer module against shock and vibration loads.

The circuit board and the heat transfer module are preferably positioned in a manner such that the circuit board may be electrically and thermally disconnected from the balance of the system simply by moving it away from the electrical connector and the first thermal connector to remove the card edge connector from the electrical connector socket, and the third thermal connector from the first thermal connector.

According to another feature of the invention, the first thermal connector comprises first and second opposing separate body sections having facing recesses that combinatively define in the first thermal connector a socket opening for removably receiving the third thermal connector, and a clamping structure operative to clamp the first and second body sections against opposite sides of the received third thermal connector. This clamping ability permits a good heat-conductive contact between the first: and third thermal connectors without the use of, for example, thermal grease at their surface interfaces.

DETAILED DESCRIPTION

Figure 1:
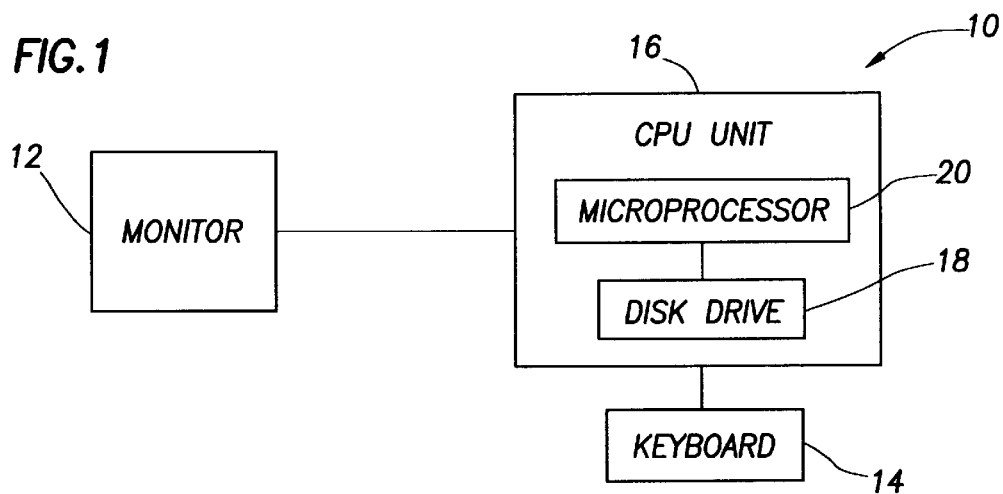
FIG. 1 is a schematic diagram of a computer system having a CPU unit in which a specially designed cooling system, embodying principles of the present invention, is incorporated.

As schematically depicted in FIG. 1, the present invention provides electronic apparatus which is representatively in the form of a computer system 10 comprising a monitor 12 and keyboard 14 operatively coupled to a CPU unit 16. The CPU unit 16 has a data storage device therein, representatively a disk drive 18, for storing data that may be retrieved by a microprocessor 20 disposed within the CPU unit 16.

Figure 2:
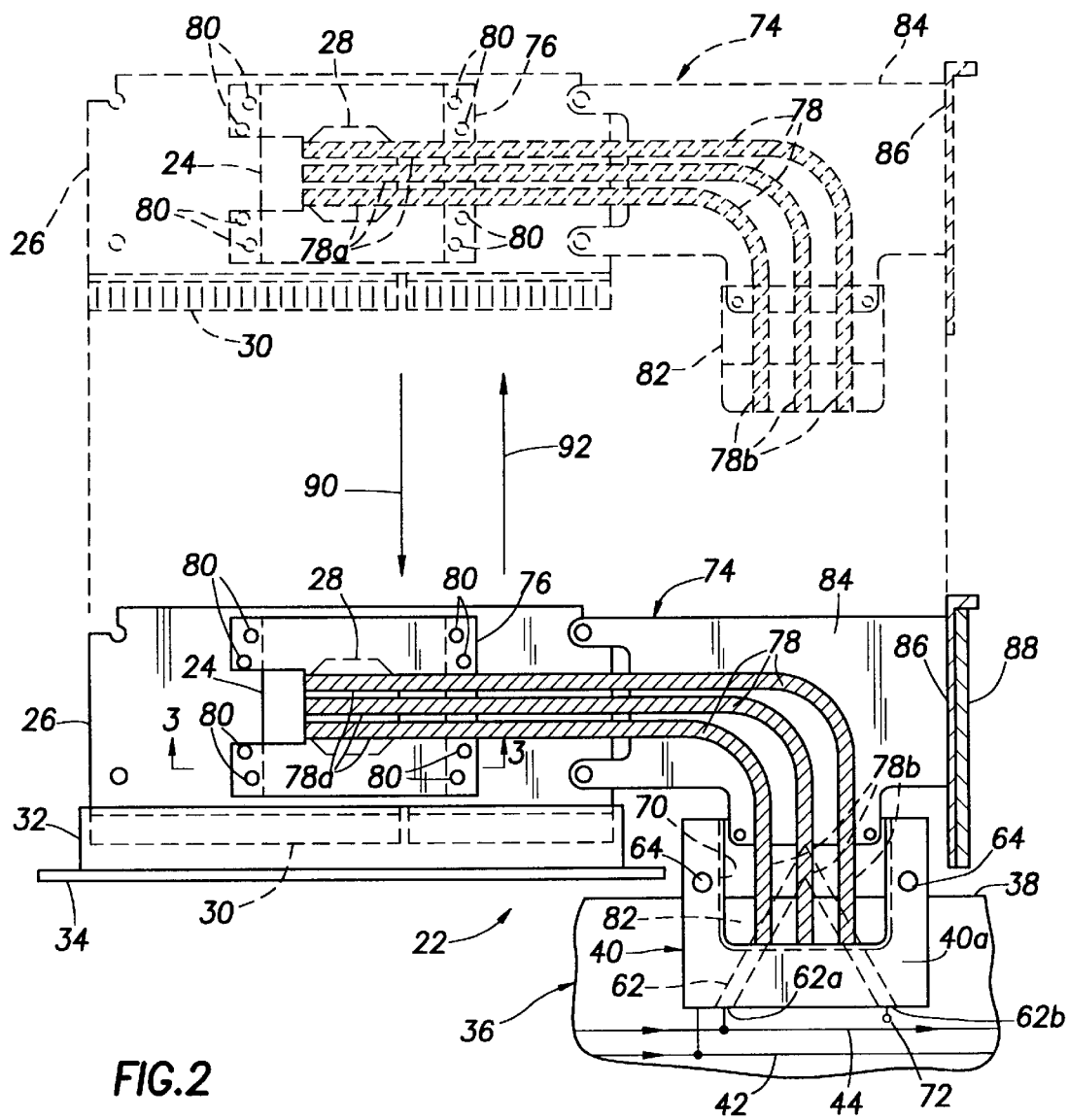
FIG. 2 is a simplified, somewhat schematic interior elevational view of the CPU unit showing a processor portion thereof to which a plug-in heat pipe cooling module of the present invention is operatively coupled.
Figures 3, 4:
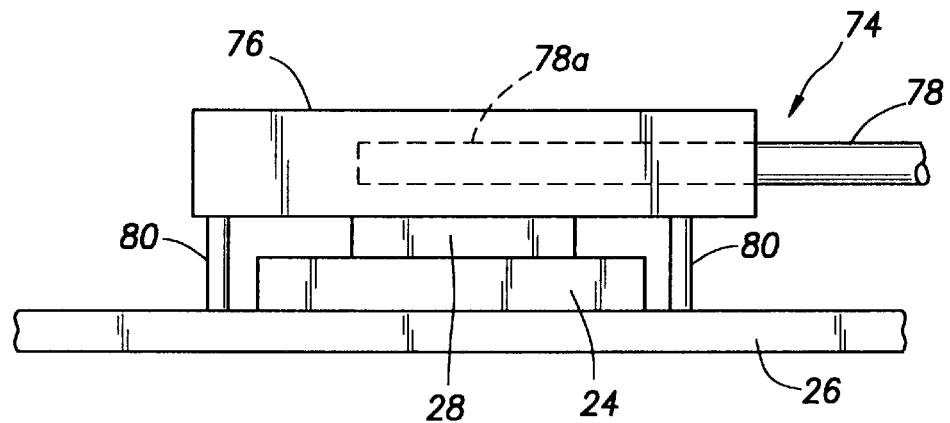
FIG. 3 is an enlarged scale schematic cross-sectional view through the processor and cooling module taken along line 3—3 of FIG. 2.
FIG. 4 is a schematic diagram of self-contained cooling system to which the cooling module is removably secured.

Disposed in the interior of the CPU unit 16 is a specially designed cooling system 22 which embodies principles of the present invention and is utilized to efficiently cool various heat-generating components within the CPU unit 16 during operation thereof. As shown in FIGS. 2 and 3, one such component is representatively a high speed processor chip 24 which is mounted on a processor board 26 and has a metal heat slug 28 on its outer side. The processor board 26 has a card edge connector portion 30 which is removably received in a connector socket 32 mounted atop a system board 34.

Turning now to FIGS. 2 and 4, the cooling system 22 includes a sealed, sel:E contained, fluid-cooled heat sink structure 36 that includes a hollow housing 38. Extending inwardly through an outer wall portion of the housing 38 are a plurality of specially designed liquid-cooled socket structures 40, representatively four in number, only one of which is shown in FIG. 2. Via supply and return piping 42,44 (preferably flexible tubing) interconnected as shown between the outlet 46 and inlet 48 of a pump 50 disposed within the housing 38, a suitable cooling liquid is continuously recirculated sequentially through the sockets 40 (via subsequently described flow passages therein) and a radiator 52 extending outwardly through an external wall portion of the housing 38.

An air duct 54 having a fan 56 therein is extended through the interior of the housing 38 between the radiator 52 and an air inlet structure 58 supported on an external wall portion of the housing 38. During operation of the fan 56, ambient air 60 is sequentially drawn inwardly through the inlet structure 58 (see FIG. 4), forced rightwardly through the interior of the duct 54, and forced outwardly through the air side of the radiator 52 to carry away socket heat (delivered to the sockets 40 from the processor chip 24 and other heat-generating components as later described) transferred to the cooling liquid delivered to the radiator 52 via the return piping 44. As will be readily appreciated by those of skill in this particular art, a variety of other fluid-based techniques may be used to remove heat from the sockets 40.

Figure 5:
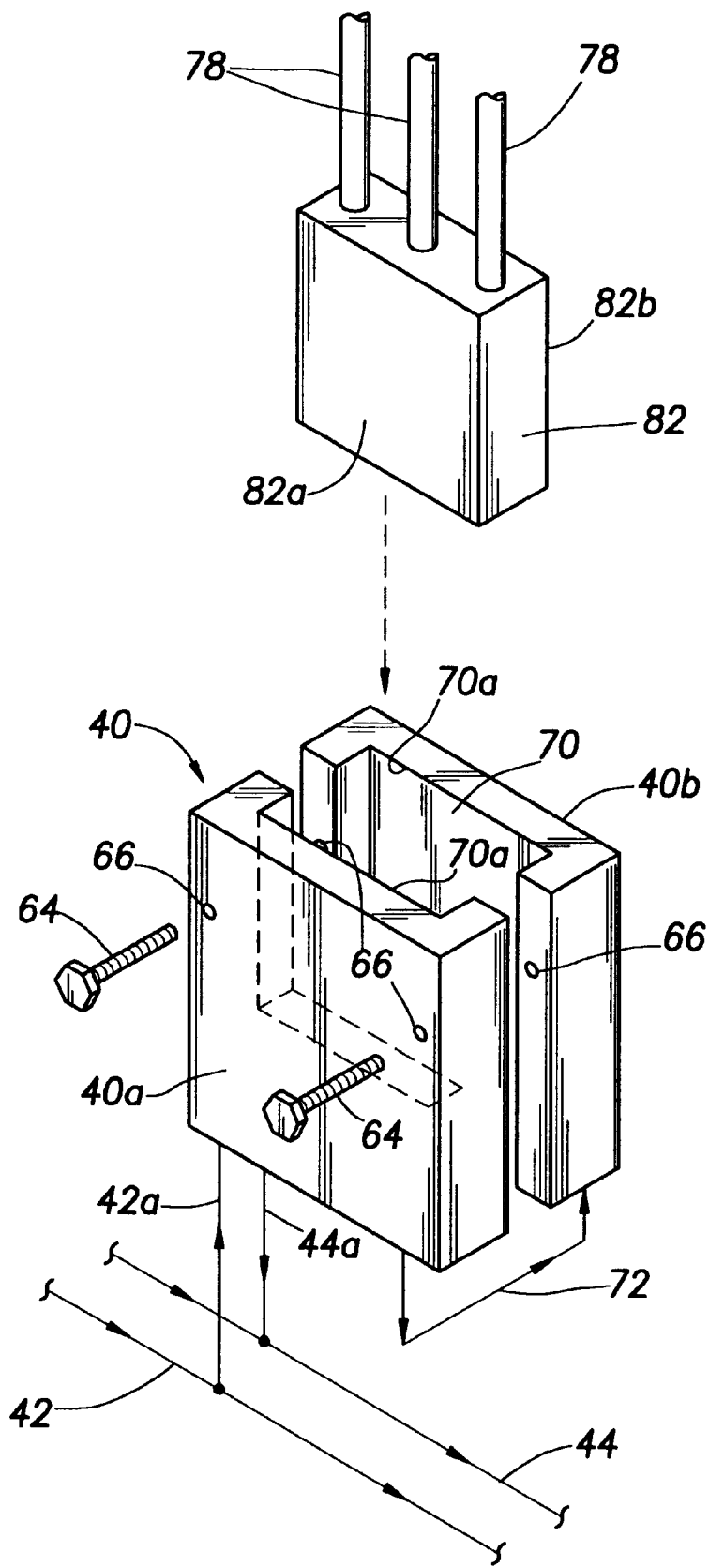
FIG. 5 is an exploded perspective view of a socketed module connection portion of the cooling system.

With reference now to FIGS. 2 and 5, each socket 40 illustratively has a generally rectangular shape and is defined by two opposing rectangular body sections 40a and 40b each having an internal fluid flow passage 62 (see FIG. 2) that opens outwardly through spaced apart inlet/outlet openings 62a,62b in the bottom side of its associated body section. The body sections 40a,40b are releasably clamped together with suitable fastening structures such as bolts 64 extending through and threaded into body section openings 66. Appropriate access to the fastening structures 64 from the exterior of the housing 38. Rectangular cutout areas 70a formed in facing side surface portions of the body sections 40a,40b collectively define in the assembled socket 40 a rectangular socket opening 70 extending downwardly through the top end of the socket 40.

Representatively, at each socket 40 liquid piping supply and return branch lines 42a,44a (see FIG. 5) are respectively connected to the openings 62a in the opposing body sections 40a and 40b, and the two body section openings 62b are joined by a short length of flexible tubing 72. Accordingly, at each socket 40 cooling liquid is forced therethrough sequentially via (1) the opening 62a of the body section 40a, (2) the internal flow passage 62 of body section 40a, (3) the opening 62b of body section 40a, (4) the flexible tubing 64, (5) the opening 62b of body section 40b, (6) the internal flow passage 62 of body section 40b, and (7) the opening 62a in body section 40b.

During operation of the CPU unit 16, heat generated by the processor chip 24 (see FIG. 2) is efficiently transferred to one of the liquid-cooled sockets 40 by means of a specially designed plug-in heat pipe cooling module 74. Other heat-generating components (not shown) within the CPU unit 16 are also connected to other sockets 40 by additional plug-in modules 74 (also not shown).

The representative plug-in heat pipe cooling module 74 shown in FIG. 2 includes a generally rectangular metal evaporator plate 76 in which the heat-receiving evaporator ends 78a of a plurality of thermosyphoning type heat pipes 78 (representatively three in number) are suitably imbedded. As indicated in FIG. 3, the evaporator plate 76 is representatively held in thermal communication with the microprocessor chip 24 by clamping the plate 76 downwardly against the thermal slug 28 using suitable fasteners 80 removably connected between the plate 76 and the processor board 26.

Cooling module 74 also includes a generally rectangular metal condensing plate 82 within which the heat-rejecting condensing ends 78b of the heat pipes 78 are suitably imbedded, the condensing plate 82 being sized for complementary receipt in the top end recess 70 of the socket 40 illustrated in FIGS. 2 and 5. The processor board 26 is secured to the condensing plate 82 by a sheet metal bracket 84 having, at a right or outer end thereof, a flange portion 86 removably connectable to a chassis section 88 of the CPU unit 16.

The dotted line upper position of the plug-in heat pipe cooling module 74 shown in FIG. 2 is in its uninstalled position, operatively attached to the processor board 26, with the processor board 26 not yet plugged into the system board connector socket 32. With the socket bolts 64 loosened, the processor board 26 and its associated cooling module 74 are easily and quickly installed within the CPU unit 16 simply by moving them downwardly toward the system board 34 and socket 40, as indicated by the arrow 90 in FIG. 2, to bring the processor board 26 and cooling module 74 to their solid line installed orientations in FIG. 2 in which the processor board connector edge portion 30 has entered the system board connector 32, and the condenser plate 82 has been plugged into the opening 70 of the underlying liquid-cooled socket 40.

After this has been done, the bracket flange 86 is suitably secured to the chassis section 88, and the socket bolts 64 are tightened to firmly clamp the opposing socket body sections 40a,40b (see FIG. 5) against the opposite side surfaces 82a,82b of the plugged-in condensing plate 82. This clamping feature of the socket 40 provides a good thermal interface between the socket 40 and the plate 82 without the need for thermal grease within the socket. This efficient thermal interface between the socket 40 and the associated condensing plate 82 is enhanced by flat-machining the contacting surfaces of the socket and condensing plate, exerting a relatively high clamping force (i.e., substantially greater than ten pounds of clamping force) between the socket and condensing plate, and positioning the bolts 64 so that the socket body sections 40a,40b are permitted to "float" on the clamping mechanism to assure good coplanarity between the clamped contacting socket and condensing plate surfaces.

During operation of the CPU unit 16, heat generated by the processor chip 24 is conducted through the slug 28 to the evaporator plate 82 and into the ends 78a of the heat pipes 78. The heat is then sequentially transmitted, through the heat pipes 78, into the condensing plate 82 and into the socket 40. Heat received by the socket 40 is then dissipated to ambient by the fluid-cooled heat sink structure 36 (see FIG. 4) as previously described herein.

When it is desired to remove the processor board 26 the socket bolts 64 are simply loosened, and the bracket flange portion 86 uncoupled from the chassis section 88 (see FIG. 2). The processor board 26 and the attached plug-in cooling module 74 may then be electrically and thermally decoupled from the balance of the system by simply pulling them upwardly, as indicated by the arrow 92 in FIG. 2, to remove the card edge connector 30 from the system board connector socket 32 and remove the condensing plate 82 from its associated fluid-cooled socket 40.

The modular plug-in cooling system described above can be used in a variety of electronic devices to cool heat-producing components such as microprocessors, disk drives, option cards, etc. without affecting the components around them. The design of the cooling system is beneficially made a separate engineering task which is decoupled from system electrical design. The electrical designers are thus freed to layout their components according to electrical considerations, with significantly reduced mechanical constraints. A variety of advantages are desirably associated with the specially designed component cooling system just described. These advantages include:

1. The processor card assembly can be removed and service it without disassembling the thermal interface at the processor.
2. System air speeds can be reduced, thereby permitting the system to run more quietly.
3. Processor modules can be spaced much more closely.
4. Air flow restriction to other components is substantially reduced.
5. Local conditions around the processor module do not affect performance.
6. A single processor module/thermal connector design can be used in multiple chassis.
7. Processor heat is removed from the system without heating the air used to cool other components.
8. Compared to the use of large metal heat sinks in forced convection cooling schemes, there is less unsupported heat transfer mass.
9. The cooling system is scaleable to provide for much higher power processors.
10. No plumbing is required in the processor area.
11. Multiple processor systems only need to ship with the appropriate number of cooling sockets. The heat pipe assembly would ship with additional processor modules.

The foregoing detailed description is to be clearly understood as being given by way of illustration and example only, the spirit and scope of the present invention being limited solely by the appended claims.

What is claimed is:

1. Electonic apparatus comprising:

a heat-generating structure;

a first thermal connector spaced apart from said heat-generating structure;

a fluid cooling system isolated from said heat-generating structure and operative to dissipate heat received by said first thermal connector; and a heat transfer module operative to transfer heat from said heat-generating structure to said first thermal connector and including:

a second thermal connector disposed in a heat exchange relationship with said heat-generating structure, a third thermal connector removably connectable to said first thermal connector in a heat exchange relationship therewith, and a heat transfer structure interconnected between said second and third thermal connectors and operative to transfer heat from said second thermal connector to said third thermal connector, said first thermal connector having a generally socket-like configuration, and said third thermal connector having a generally plug-like configuration so as to be received within an interior portion of said first thermal connector, said first thermal connector including first and second opposing separate body sections having facing recesses that combinatively define in said first thermal connector a socket opening for removably receiving said third thermal connector, and a clamping structure operative to clamp said first and second body sections toward one another against opposite sides of the received third thermal connector.

2. The electronic apparatus of claim 1 wherein:

said second thermal connector is an evaporator plate member, said third thermal connector is a condenser plate member, and said heat transfer structure includes a plurality of thermosyphoning heat pipes having evaporator end portions connected to said evaporator plate member and condenser end portions connected to said condenser plate member.

3. The electronic apparatus of claim 1 wherein:

said electronic apparatus further comprises a circuit board, said heat-generating structure is mounted on said circuit board, and said heat transfer module further includes a support structure interconnected between said circuit board and said third thermal connector.

4. The electronic apparatus of claim 1 wherein:

said electronic apparatus further comprises an electrical connector socket, and said circuit board has a connector edge portion removably receivable in said electrical connector socket.

5. The electronic apparatus of claim 4 wherein said circuit board and said third thermal connector, respectively, may be disconnected from said electrical connector socket and said first thermal connector by simultaneously moving said circuit board and said heat transfer module away from said electrical connector socket and said first thermal connector.

6. The electronic apparatus of claim 5 wherein:

said electronic apparatus has a chassis portion, and said support structure is releasably connectable to said chassis portion.

7. The electronic apparatus of claim 1 wherein said electronic apparatus is a computer.

8. Electronic apparatus comprising:

a heat-generating structure;

a cooling system including a housing carrying an externally accessible socket structure, and apparatus disposed within said housing for extracting and dissipating heat received by said socket member, said apparatus disposed within said housing being operative to flow fluid through said socket structure and transfer heat from said socket structure to said fluid; and a heat transfer module through which heat from said heat-generating structure may be transmitted to said socket structure, said heat transfer module including:
a first portion placeable in thermal communication with said heat-generating structure, and
a second portion which may be releasably plugged into said socket structure in thermal communication therewith,
said first heat transfer module portion being a thermally conductive evaporator member,
said second heat transfer module portion being a thermally conductive condenser member, and
said heat transfer module further including at least one heat pipe having a first end portion in thermal communication with said evaporator member, and a second end portion in thermal communication with said condenser member.

9. Electronic apparatus comprising:

a heat-generating structure;

a cooling system including a housing carrying an externally accessible socket structure, and apparatus disposed within said housing for extracting and dissipating heat received by said socket member, said apparatus disposed within said housing being operative to flow fluid through said socket structure and transfer heat from said socket structure to said fluid, said socket structure including:
first and second opposing separate body sections having facing recesses that combinatively define in said socket structure a socket opening for removably receiving said second portion of said heat transfer module, and
a clamping structure operative to clamp said first and second body sections against said second portion of said heat transfer module; and a heat transfer module through which heat from said heat-generating structure may be transmitted to said socket structure, said heat transfer module including:
a first portion placeable in thermal communication with said heat-generating structure, and
a second portion which may be releasably plugged into said socket structure in thermal communication therewith.

10. A computer system comprising:

a microprocessor;

a data storage device operative to store data that may be retrieved by said microprocessor;

a heat-generating structure;

a first thermal connector spaced apart from said heat-generating structure;

a fluid cooling system isolated from said heat-generating structure and operative to dissipate heat received by said first thermal connector; and a heat transfer module operative to transfer heat from said heat-generating structure to said first thermal connector and including:
a second thermal connector disposed in a heat exchange relationship with said heat-generating structure,
a third thermal connector removably connectable to said first thermal connector in a heat exchange relationship therewith, and
a heat transfer structure interconnected between said second and third thermal connectors and operative to transfer heat from said second thermal connector to said third thermal connector,
said first thermal connector having a generally socket-like configuration, and said third thermal connector having a generally plug-like configuration so as to be received within an interior portion of said first thermal connector,
said first thermal connector including first and second opposing separate body sections having facing recesses that combinatively define in said first thermal connector a socket opening for removably receiving said third thermal connector, and a clamping structure operative to clamp said first and second body sections toward one another against opposite sides of the received third thermal connector.

11. The computer system of claim 10 wherein:

said second thermal connector is an evaporator plate member, said third thermal connector is a condenser plate member, and said heat transfer structure includes a plurality of thermosyphoning heat pipes having evaporator end portions connected to said evaporator plate member and condenser end portions connected to said condenser plate member.

12. The computer system of claim 10 wherein:

said computer system further comprises a circuit board, said heat-generating structure is mounted on said circuit board, and said heat transfer module further includes a support structure interconnected between said circuit board and said third thermal connector.

13. The computer system of claim 12 wherein:

said computer system further comprises an electrical connector socket, and said circuit board has a connector edge portion removably receivable in said electrical connector socket.

14. The computer system of claim 13 wherein said circuit board and said third thermal connector, respectively, may be disconnected from said electrical connector socket and said first thermal connector by simultaneously moving said circuit board and said heat transfer module away from said electrical connector socket and said first thermal connector.

15. The computer system of claim 14 wherein:

said computer system has a chassis portion, and said support structure is releasably connectable to said chassis portion.

16. A computer system comprising:

a microprocessor;

a data storage device operative to store data that may be retrieved by said microprocessor;

a heat-generating structure;

a cooling system including a housing carrying an externally accessible socket structure, and means disposed within said housing for extracting and dissipating heat received by said socket member, said means disposed within said housing including means for flowing fluid through said socket structure and transferring heat from said socket structure to said fluid; and a heat transfer module through which heat from said heat-generating structure may be transmitted to said socket structure, said heat transfer module including:

a first portion placeable in thermal communication with said heat-generating structure, and a second portion which may be releasably plugged into said socket structure in thermal communication therewith, said first heat transfer module portion being a thermally conductive evaporator member, said second heat transfer module portion being a thermally conductive condenser member, and said heat transfer module further including at least one heat pipe having a first end portion in thermal communication with said evaporator member, and a second end portion in thermal communication with said condenser member.

17. A computer system comprising:

a microprocessor;

a data storage device operative to store data that may be retrieved by said microprocessor;

a heat-generating structure;

a cooling system including a housing carrying an externally accessible socket structure, and apparatus disposed within said housing for extracting and dissipating heat received by said socket member, said apparatus disposed within said housing being operative to flow fluid through said socket structure and transfer heat from said socket structure to said fluid, said socket structure including:

first and second opposing separate body sections having facing recesses that combinatively define in said socket structure a socket opening for removably receiving said second portion of said heat transfer module, and a clamping structure operative to claim said first and second body sections against said second portion of said heat transfer module; and a heat transfer module through which heat from said heat-generating structure may be transmitted to said socket structure, said heat transfer module including:

a first portion placeable in thermal communication with said heat-generating structure, and a second portion which may be releasably plugged into said socket structure in thermal communication therewith.

* * * * *